(12) United States Patent
Velsher (10) Patent No.: US 7,184,646 B2
(45) Date of Patent: Feb. 27, 2007

(54) OPTICAL MODULE WITH MULTIPLE OPTICAL SOURCES

(75) Inventor: Benne Velsher, Littleton, MA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 10/709,135

(22) Filed: Apr. 15, 2004

(65) Prior Publication Data

US 2005/0232533 A1 Oct. 20, 2005

(51) Int. Cl.
G02B 6/12 (2006.01)
G02B 6/00 (2006.01)

(52) U.S. Cl. .......................................... 385/140; 385/14

(58) Field of Classification Search .................. 385/14, 385/15, 24, 48–52, 129–131
See application file for complete search history.

(56) References Cited

U.S. PATENT DOCUMENTS

| 5,666,450 | A | 9/1997 | Fujimura et al. ............ 385/93 |
| 6,266,196 | B1 * | 7/2001 | Do et al. ..................... 359/819 |
| 6,445,837 | B1 * | 9/2002 | Hatami Hanza ............. 385/14 |
| 2002/0037141 | A1 | 3/2002 | Miyamoto et al. |
| 2002/0090172 | A1 | 7/2002 | Okazaki et al. |
| 2004/0047561 | A1 * | 3/2004 | Tuda .......................... 385/39 |
| 2004/0234205 | A1 * | 11/2004 | Shimada et al. ............. 385/50 |

FOREIGN PATENT DOCUMENTS

| DE | 196 13 755 A1 | 10/1997 |
| EP | 1 182 481 A2 | 2/2002 |
| EP | 1 387 195 A2 | 2/2004 |
| GB | 2 392 552 A | 3/2004 |
| JP | 57068098 | 4/1982 |

OTHER PUBLICATIONS

Optoelectronic Assembly and Packaging Technology, May 2003, pp. iv-48, IPC, Northbrook, IL, US.

Velsher, High-Speed Optoelectronic Packaging, 2002 GaAs IC Symposium, Oct. 20-23, 2001, pp. 1-56, Kyocera America Inc., Monterey, California, US.

* cited by examiner

Primary Examiner—Sung Pak
Assistant Examiner—Tina M. Wong
(74) Attorney, Agent, or Firm—Allen, Dyer, Doppelt, Milbrath & Gilchrist, P.A.

(57) ABSTRACT

A multi-source optical module is described that includes an optical circuit positioned on a base. The optical circuit includes a first and a second optical input. A first and a second optical source are positioned on the base relative to the optical circuit. A first lens is positioned between an output of the first optical source and a first input of the optical circuit. A second lens is positioned between an output of the second optical source and a second input of the optical circuit. At least one of the first and the second lenses are positionable so that the output of a respective one of the first and second optical sources and a respective one of the first and the second optical inputs of the optical circuit are aligned.

24 Claims, 6 Drawing Sheets

OPTICAL MODULE WITH MULTIPLE OPTICAL SOURCES

BACKGROUND OF INVENTION

State-of-the art optical and optoelectronic systems and subsystems often include optical modules. Optical modules include passive optical components, such as optical waveguides and semiconductor waveguides. Active optical modules include optical sources, such as semiconductor lasers. Optical sources can be optically coupled to passive optical components using lens elements. Optical sources can also be optically coupled to passive optical components using free space.

BRIEF DESCRIPTION OF DRAWINGS

This invention is described with particularity in the Detailed Description and Claims sections. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Many state-of-the art optical communication systems propagate more than one independent optical signal. For example, wavelength division multiplexed (WDM) optical communication systems propagate many signals in the same optical fiber. Each of the signals propagating in the WDM communication system has a different wavelength. Propagating multiple optical signals, each with unique wavelengths, will effectively increase the aggregate bandwidth of the communication system to the sum of the bandwidths of each optical signal. Dense Wavelength Division Multiplexing (DWDM) is a technology that implements WDM technology with a large number of wavelengths. DWDM is typically used to describe WDM technology that propagates more than 40 wavelengths in a single optical fiber.

The independent multiple optical signals used in optical communication systems are typically generated using independent optical sources. Most known active optical modules include only one optical source because there are many technical challenges in making an optical module with multiple optical sources. One technical challenge is that it is very difficult to align multiple optical sources to a single optical component within an optical module. Another technical challenge is that heat generated by one optical source can effect the operation of another optical source. For example, heat generated by one optical source can change the wavelength of another optical source. Therefore, each optical source may need to be thermally isolated.

Figure 1:
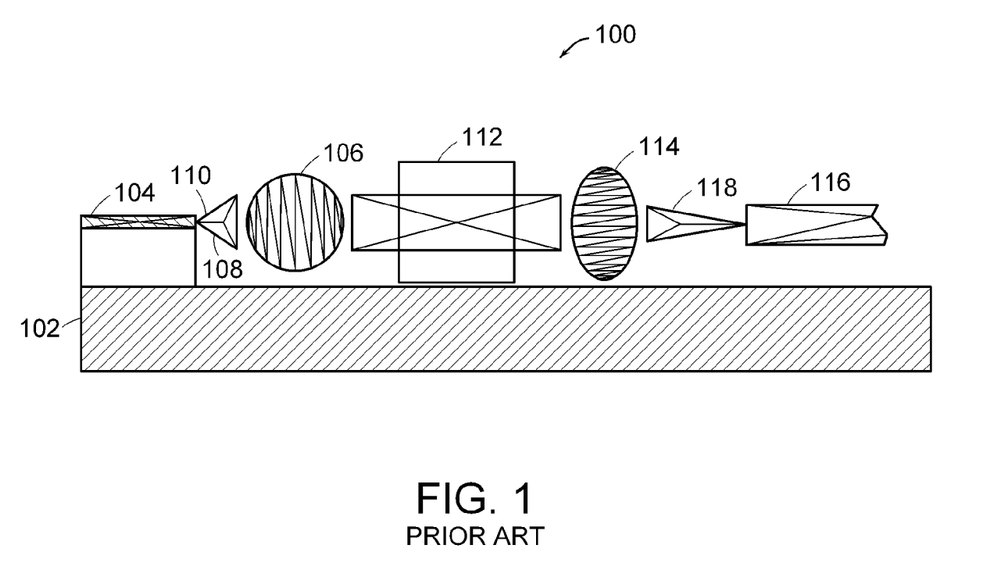
FIG. 1 is a block diagram of a prior art active optical module that includes a semiconductor laser and passive optical components.

FIG. 1 is a block diagram of a prior art active optical module 100 that includes a semiconductor laser and passive optical components. The passive optical components in FIG. 1 are used to couple the optical beam generated by the semiconductor laser to an optical fiber. The optical module 100 includes a base 102 or platform that supports the active and passive optical components. A semiconductor laser 104 is positioned on the base 102.

A first lens 106, such as a ball lens, is aligned to the optical beam 108 propagating from the output 110 of the semiconductor laser 104 and is then attached to the base 102. A passive optical component 112, such as an optical isolator, is aligned to the optical beam 108 propagating from the first lens 106 and is then attached to the base 102. A second lens 114, such as a ball lens, is aligned to the optical beam 108 propagating from the passive optical component 112 and is then attached to the base 102. An optical fiber 116 is aligned to the optical beam 118 propagating from the passive optical component 112.

Figure 2:
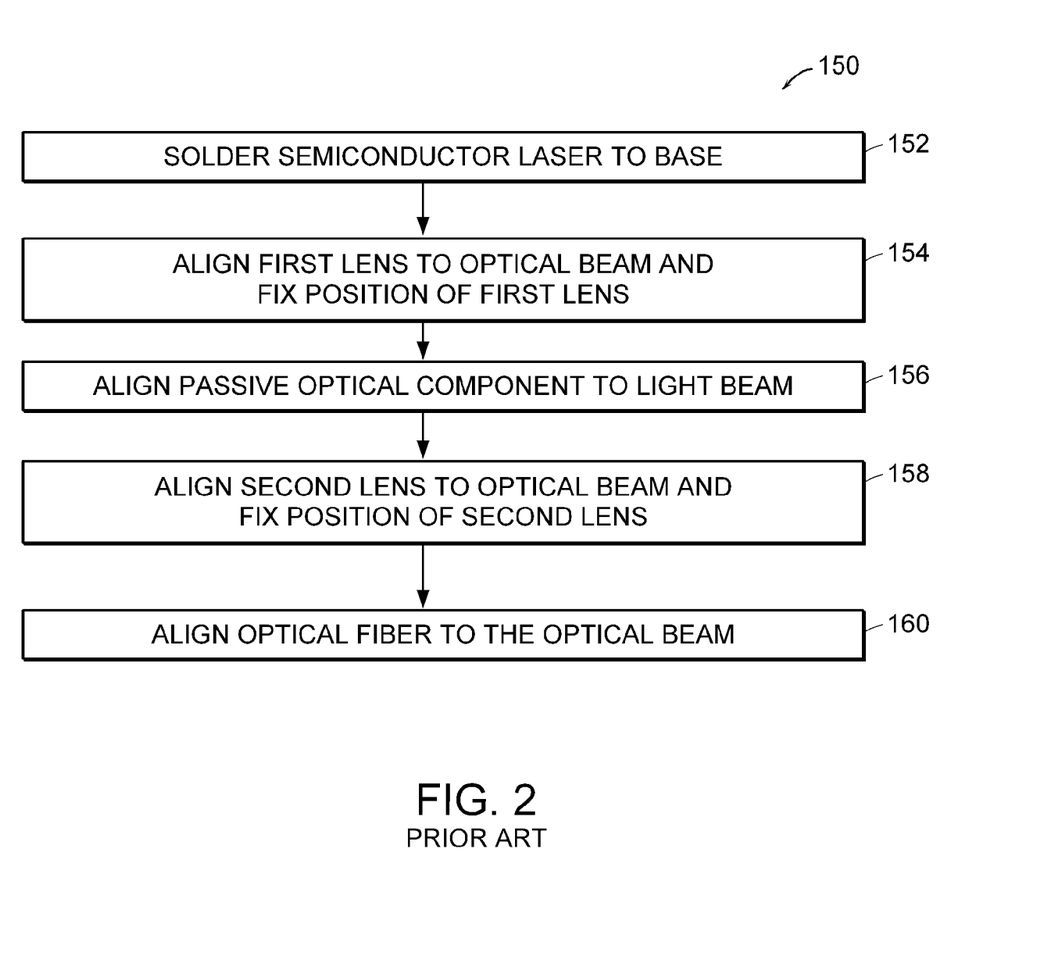
FIG. 2 is a flow chart of a method of assembling the prior art active optical module that is described in connection with FIG. 1.

FIG. 2 is a flow chart of a method 150 of assembling the prior art active optical module 100 that is described in connection with FIG. 1. The method 150 of assembling the prior art active optical module 100 is a method that attaches active and passive optical components in series along the optical path of the optical beam 108 generated by the semiconductor laser 104. The method 150 is a "daisy chain" process that begins with attaching the semiconductor laser 104.

The first step 152 includes soldering the semiconductor laser 104 (FIG. 1) to the base 102. The first step 152 fixes the position of the semiconductor laser 104 and thus fixes the propagation path of the optical beam 108 that is generated by the semiconductor laser 104. The semiconductor laser 104 is also positioned to achieve a good thermal contact between the semiconductor laser 104 and the base 102 without regard to other considerations, such reducing optical loss. Achieving a good thermal contact is important because the semiconductor laser 104 generates significant heat that must be dissipated.

The second step 154 includes aligning the first lens 106 (FIG. 1) to the optical beam 108 that is generated by the semiconductor laser 104 and then fixing the position of the first lens 106 after the alignment. The third step 156 includes aligning the passive optical component to the optical beam propagating from the first lens 106. The fourth step 158 includes aligning the second lens 114 to the optical beam propagating from the passive optical component 112 and then fixing the position of the second lens 114. The fifth step 160 includes aligning the optical fiber 116 to the optical beam propagating from the second lens 114.

The method 150 of assembling the prior art active optical module 100 that is described in connection with FIG. 1 can be used to assemble an optical module including a semiconductor laser that generates a single optical beam. The method 150 can also be used to assemble an optical module including a semiconductor laser array that generates multiple optical beams as long as the semiconductor laser array is contained in a single physical device. However, the method 150 can not be used to achieve good coupling efficiency between two physically separate semiconductor laser devices and a single optical circuit.

The methods and apparatus of the present invention relate to increasing the level of integration in optical and optoelectronic modules by including more than one optical source in a single optical module or by including optical inputs for more than one independent optical signal. Thus, optical modules according to the present invention can propagate and process more than one independent optical signal. In some embodiments, the optical module of the present invention includes multiple optical sources that are coupled to a single optical circuit. In other embodiments, the optical module of the present invention optically couples signals from more than one external optical source to a single optical circuit.

Figure 3:
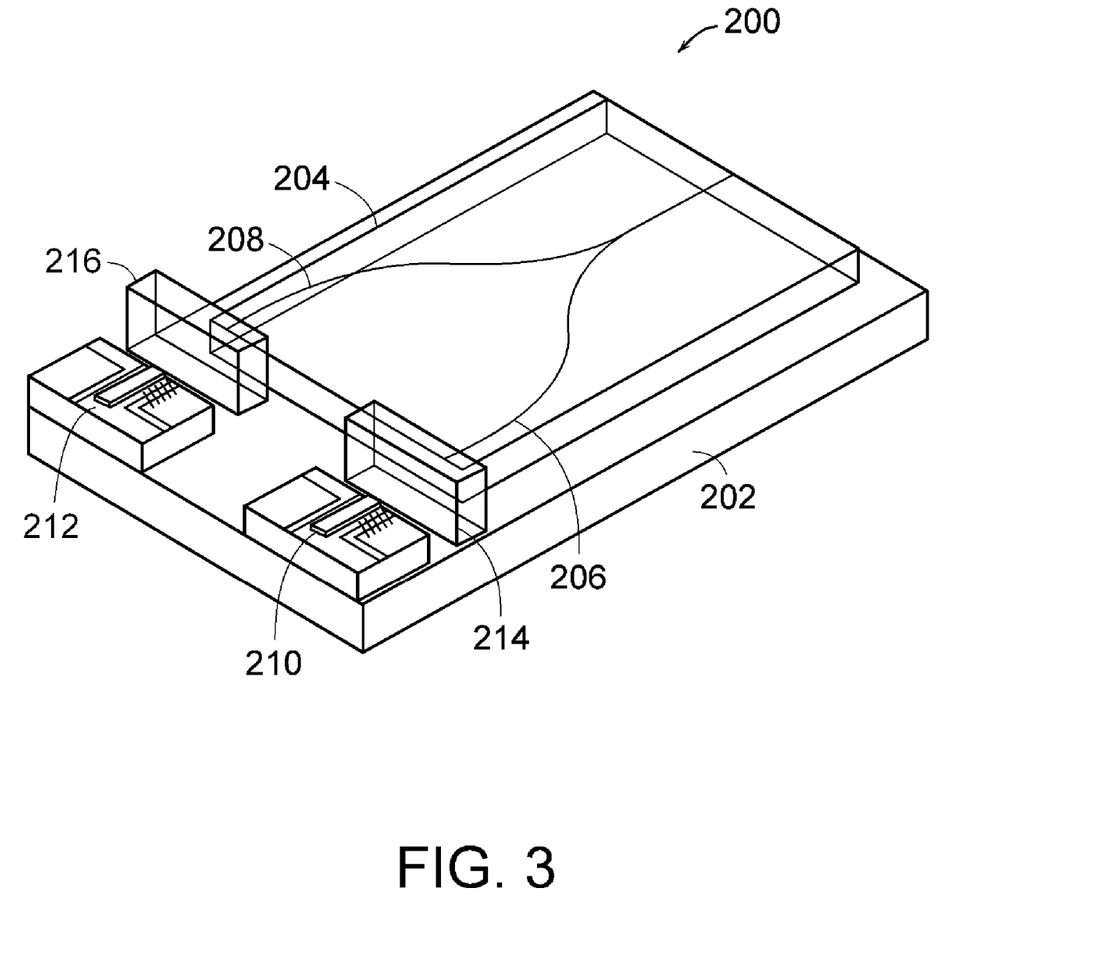
FIG. 3 is a diagram of a multi-source optical module according to the present invention.

FIG. 3 is a diagram of a multi-source optical module 200 according to the present invention. The multi-source optical module 200 includes a base 202 or platform that supports the active and passive optical components. The base 202 can be formed of numerous types of materials. For example, the base 202 can be formed of a ceramic material, such as aluminum nitride, beryllium oxide, or silicon carbide. The base can also be formed of a metal matrix composite material, such as copper tungsten, aluminum silicon, or aluminum silicon carbide. In one embodiment, the thermal expansion coefficient of the base material is chosen to be close to or approximately match the thermal expansion coefficient of at least some of the active and/or passive optical components.

An optical circuit 204 is positioned on the base 202. The term "optical circuit" is defined herein to mean any type of optical circuit including, but not limited to, planar-type optical integrated circuits that have planar waveguides, discrete-type optical circuits having at least one discrete optical or micro-optical component, and hybrid-type optical circuits having both a planar-type optical integrated circuit and a hybrid-type optical circuit. For example, the optical circuit 204 can include a first 206 and a second optical waveguide 208 as shown in FIG. 3. In one embodiment, the optical circuit 204 performs optical multiplexing and/or optical demultiplexing operations.

The optical circuit 204 is typically attached to the base 202. Numerous means for attaching the optical circuit 204 can be used. For example, the optical circuit 204 can be attached to the base 202 with an adhesive material. In some embodiments, the optical circuit 204 is soldered to the base 202 to form a good thermal contact with the base. In these embodiments, the mating surface of the base 202 and the mating surface of the optical circuit 204 both have a finish that is suitable for soldering.

A first 210 and a second optical source 212 are positioned on the base 202 relative to the optical circuit 204. The first 210 and the second optical source 212 can be single discrete optical sources, such as discrete semiconductor laser diodes. The optical modules of the present invention are particularly well suited for including multiple single high-power semiconductor laser diodes because such sources can be positioned at the edges of the module to increase the thermal impedance between the sources.

The first 210 and the second optical source 212 can also be arrays of optical sources, such as one-dimensional semiconductor diode arrays. In some embodiments, one of the first 210 and the second optical source 212 is a single source and the other of the first 210 and the second optical source 212 is an array of optical sources.

The first 210 and the second optical source 212 are typically soldered to the base 202 to form a good heat contact with the base. The soldering procedure and solder material are chosen to prevent reflow of solder material used in prior assembly steps. For example, a solder can be used that has a lower melting point than solders used in previous assembly steps, such as soldering the optical circuit 204 to the base 202. Specially designed soldering apparatus that apply localized heat pulses can be also be used to prevent or minimize solder reflow.

In one embodiment, the second optical source 212 is positioned relative to the first optical source 210 on the base 202 so as to increase the thermal impedance between the first 210 and the second optical source 212. In some embodiments, the first 210 and the second optical source 212 are positioned so that the first optical source 210 is thermally isolated from the second optical source 212.

The multi-source optical module of the present invention optically couples multiple optical sources to a single optical circuit by using intermediate optical elements. The intermediate optical elements can be optical filters, wave-plates, or optical lenses. More than one type of intermediate optical element can be used in a single multi-source optical module.

In the embodiment shown, a first 214 and a second lens 216 are positioned on the base 202. The first lens 214 is positioned between an output of the first optical source 210 and an input of the first optical waveguide 206. The second lens 216 is positioned between an output of the second optical source 212 and an input of the second optical waveguide 208. Any type of lens could be used. For example, the first 214 and second lens 216 can be silicon or plastic lenses.

At least one of the first 214 and the second lens 216 is positionable so that the output of a respective one of the first 210 and second optical source 212 and the input of a respective one of the first 206 and the second optical waveguide 208 are aligned. Thus, in one embodiment, the output of the first lens 214 is positionable so that the output of the first optical source 210 is aligned to the input of the first optical waveguide 206 in the optical circuit 204. Also, in this embodiment, the output of the second lens 216 is positionable so that the output of the second optical source 212 is aligned to the input of the second optical waveguide 208 in the optical circuit 204.

The first 214 and the second lens 216 are typically positionable in more than one dimension. In one embodiment, at least one of the first 214 and the second lens 216 is positionable in at least three dimensions. In one embodiment, the first 214 and the second lens 216 are positionable in four dimensions (X, Y, Z, and theta). At least one of the first 214 and the second lens 216 can include a positioning member that has dimensions and a shape that allows a micromanipulator stage to easily contact and then position the lenses 214, 216.

Figure 4:
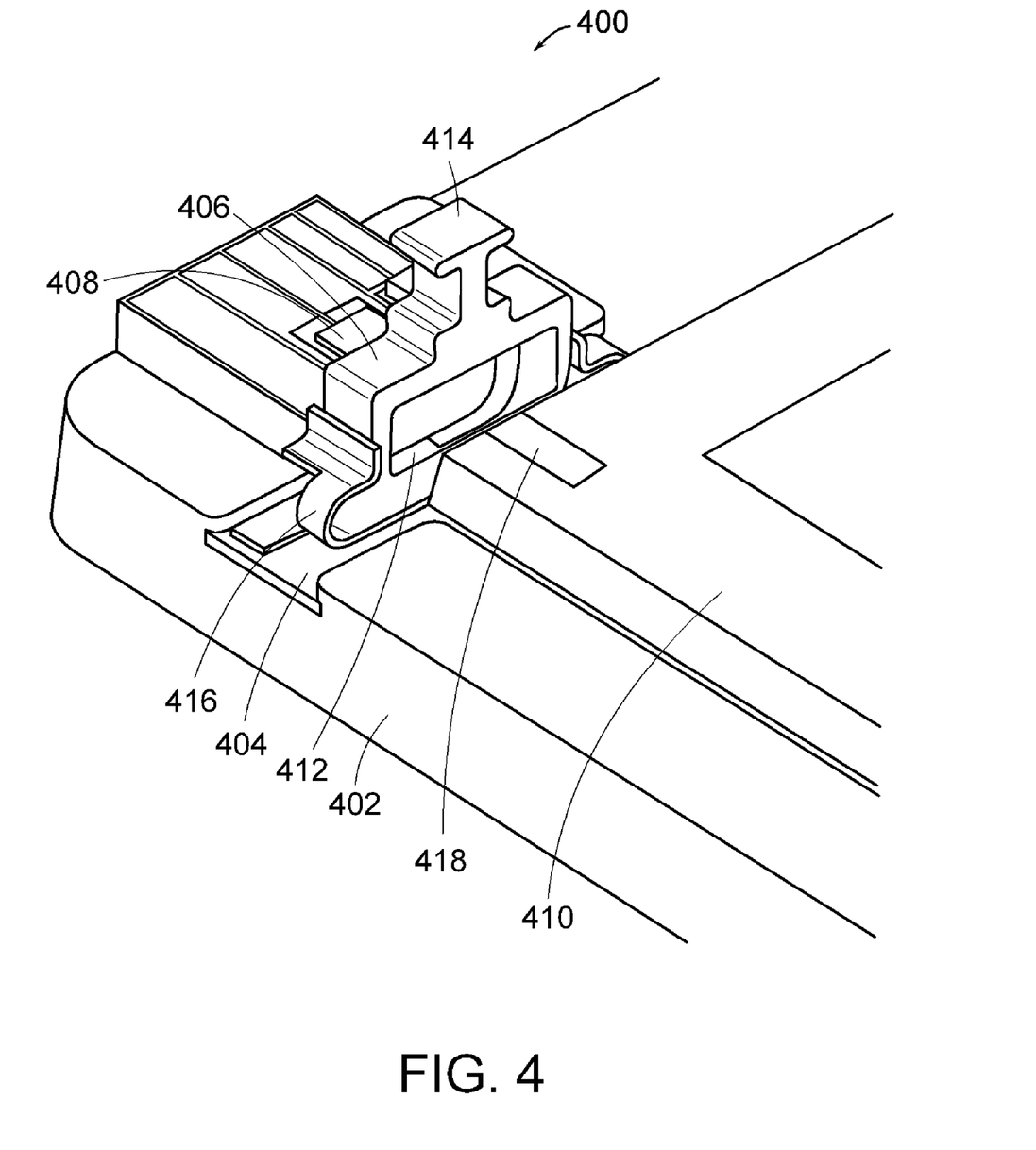
FIG. 4 is a diagram of a portion of a multi-source optical module according to the present invention that illustrates a positionable lens holder.

FIG. 4 is a diagram of a portion of a multi-source optical module 400 according to the present invention that illustrates a positionable lens holder. The optical module 400 includes a base 402 having a groove 404 that is adapted to receive the positionable lens holder 406. The optical module 400 also includes an optical source 408 that is positioned on the base 402 as described herein. In the embodiment shown in FIG. 4, the optical source 408 is a semiconductor laser. In addition, the optical module 400 includes an optical circuit 410 that is positioned on the base 402 as described herein.

The lens holder 406 supports the lens 412 and can be formed around the lens 412 as shown in FIG. 4. The lens holder 406 includes a positioning member 414 that is shaped to facilitate moving and positioning of the lens 412 with a micromanipulator stage or other fine positioning instrument. The positioning member 414 can be integrated into the lens holder 406 as shown in FIG. 4 or can be a separate unit that it attached to the lens holder 406. The positioning member 406 allows the lens 412 to be moved in multiple dimensions during alignment. For example, the positioning member 414 can allow the lens 412 to be moved in the X, Y, Z and theta axes during alignment.

In one embodiment, a lens clip 416 or other supporting structure is used to position the lens holder 406 in the groove 404 as shown in FIG. 4. In this embodiment, the lens holder 406 is positioned in the lens clip 416 and the lens clip 416 is positioned in the groove 404. The lens holder 406 can be secured to the lens clip 416 by an adhesive material or by welding. In some embodiments, the lens holder 406 and the lens clip 416 are one single unit. In other embodiments, the lens clip 416 is not used and the lens holder 406 itself is positionable in the groove 404 and can be fixed in place on the base 402 after alignment.

The positioning member 414 is used to assist the assembly technician in manipulating the lens 412 to a desired position. The lens 412 is manipulated during assembly to obtain a desired or optimum optical coupling between the output of the optical source 408 and an input of an optical waveguide 418 in the optical circuit 410.

In one embodiment, the lens clip 416 is formed in a shape and made of a material that is suitable for welding to the base 402 in order to fix the position of the lens 412 relative to the optical source 408 and relative to the optical waveguide 418 in the optical circuit 410. For example, the lens clip 416 can be formed in a shape and made of a material that is suitable for laser welding to the base 402. In addition, the lens holder 406 can be formed in a shape and made of a material that is suitable for laser welding to the lens clip 416. Welding the lens clip 416 to the base 402 and welding the lens holder 406 to the lens clip 416 during alignment will fix the position of the lens 412 relative to other active and passive components in the optical module 410.

Figure 5:
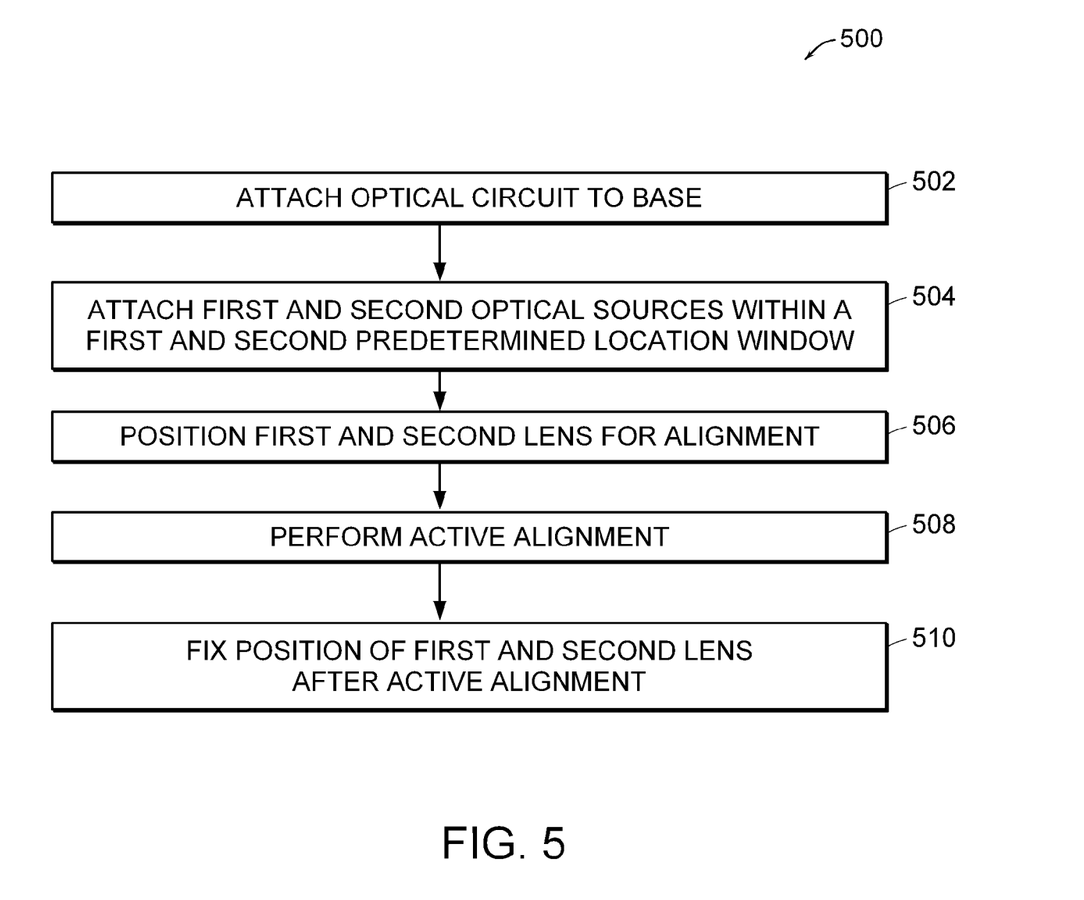
FIG. 5 is a flow chart of a method of assembling a multi-source optical module according to the present invention.

FIG. 5 is a flow chart of a method 500 of assembling a multi-source optical module according to the present invention. The methods of assembling the multi-source optical modules of the present invention are particularly useful for assembling optical modules that are designed to combine discrete optical signals having different wavelengths into a composite optical signal propagating on a single optical fiber. The methods of assembling the multi-source optical modules are also useful for assembling optical modules that are designed to decompose a combined optical signal into discrete optical signals that are channeled to separate receivers. The methods are useful for such applications because they allow multiple physically separate optical sources to be precisely aligned to a single optical circuit. The methods are also useful for such applications because the multi-source optical module of the present invention can be constructed so that there is relatively high thermal impedance between the physically separate multiple optical sources.

The first step 502 of the method 500 includes attaching the optical circuit 204 (FIG. 3) to the base 202. The attachment to the base 202 fixes the position of the first and second waveguides 206, 208 in the optical circuit 204. In one embodiment, the first and the second waveguides 206, 208 serve as reference datums for positioning all other active and passive optical elements in the multi-source optical module.

The optical circuit 204 (FIG. 3) can be attached to the base 202 by numerous means. For example, the optical circuit 204 can be attached to the base 202 using numerous types of adhesive materials. The optical circuit 204 can also be attached to the base 202 with solder. In embodiment, the optical circuit 204 is attached to the base 202 using non-organic materials that are suitable for hermetic packaging.

The second step 504 includes attaching the first and second optical sources 210, 212 (FIG. 3) within a first and a second predetermined location window, respectively. The first optical source 210 is positioned and then attached in the first predetermined location window relative to the optical circuit 204 and relative to the second predetermined location window. The second optical source 212 is positioned and then attached in the second predetermined location window relative to the optical circuit 204 and relative to the first predetermined location window.

The first and second predetermined location windows have dimensions that are small enough to allow the outputs of the first and second optical sources 210, 212 (FIG. 3) to be aligned to inputs of the respective ones of the first and second waveguides 206, 208 within a certain known optical alignment tolerance. An intermediate optical element, such as a lens, can be used to align the outputs of the first and second optical sources 210, 212 to the inputs of the respectively ones of the first and second waveguides 206, 208. For example, the first and the second optical sources 210, 212 can be attached in a predetermined location window that is about fifteen square microns.

In one embodiment, there is a low thermal impedance path between the first optical source 210 (FIG. 3) and the second optical source 212. A low thermal impedance path can be achieved by choosing the center of the first predetermined location window to be sufficiently far away from the center of the second predetermined location window. In some embodiments, a low thermal impedance path is necessary for the first and second optical sources 210, 212 to maintain emissions at particular wavelengths.

The first and the second optical sources 210, 212 (FIG. 3) can be attached to the base 202 by numerous means, such as soldering. In one embodiment, the first and the second optical sources 210, 212 are attached to the base 202 using a non-organic material that is suitable for hermetic packaging. In this embodiment, the resulting multi-source optical module is suitable for many applications requiring hermetic packaging. In other embodiments, organic materials are used to attach at least one of the first and second optical sources 210, 212 and the optical circuit 204 to the base 202. In these embodiments, the resulting multi-source optical module is less expensive to manufacture and can be more suitable for many low cost applications.

The third step 506 includes positioning a first 214 and a second lens 216 for aligning the first 210 and the second optical source 212 to the optical circuit 204. The first lens 214 is positioned between the output of the first optical source 210 and the input of the first optical waveguide 206 in the optical circuit 204. The second lens 216 is positioned between the output of the second optical source 212 and the input of the second optical waveguide 208 in the optical circuit 204.

The are numerous ways to position the first 214 (FIG. 3) and the second lens 216 for aligning the first 210 and second optical source 212 to the optical circuit 204. For example, in some embodiments, at least one of the first 214 and second lens 216 is positioned directly on the base 202. In some embodiments, at least one of the first 214 and second lens 216 is positioned in a groove 404 (FIG. 4) on the base 402.

In other embodiments, at least one of the first 214 (FIG. 3) and second lens 216 is positioned in a lens clip 416 (FIG. 4) and the lens clip 416 is positioned in a groove 404 on the base 402 as shown in FIG. 4. In this embodiment, the lens clip 416 is designed to allow the lens 412 (FIG. 4) to be displaced in multiple dimensions using a micromanipulator stage or other precise positioning means. For example, the first 214 and the second lens 216 can be positioned for aligning the outputs of the first 210 and second optical source 212 to the inputs of the first 206 and second optical waveguide 208 in the optical circuit 204 using a micromanipulator stage that moves in the X, Y, Z, and theta directions.

The fourth step 508 includes active alignment of the first 210 and second optical source 212 to a respective one of the first 206 and second waveguide 208. In one embodiment, the active alignment of the first optical source 210 is achieved by biasing the first optical source 210 so that it emits an optical beam. The optical emission through the first waveguide 206 of the integrated optical module 200 is monitored. A micromanipulator stage is then used to physically move the first lens 214 in multiple dimensions so as to increase or maximize the optical emission through the first waveguide 206, thereby achieving the desired coupling efficiency.

The second optical source 212 (FIG. 3) is then biased so that the second optical source 212 emits an optical beam. The optical emission through the second waveguide 208 of the optical circuit 204 is monitored. The micromanipulator stage is then used to physically move the second lens 216 in multiple dimensions so as to increase or maximize the optical emission through the second waveguide 208, thereby achieving the desired coupling efficiency.

The procedure for actively aligning the first 210 and second optical source 212 to the first 206 and second waveguide 208 (FIG. 3) can be repeated to actively align any number of optical sources to any number of optical waveguides or other optical components in an optical circuit. Thus, the methods of assembling a multi-source optical module according to the present invention are not limited to assembling a multi-source optical module having only two optical sources. The assembly methods of the present invention can be used to align any number of optical sources to a single optical circuit.

The fifth step 510 includes fixing the position of the first 214 and the second lens 216 after the active alignment. The position of the first 214 and the second lens 216 can be fixed by any one of numerous methods of fixing the position of an optical element without perturbing the alignment. For example, the position of the first 214 and the second lens 216 can be fixed by laser welding.

The method 500 of assembling a multi-source optical module can achieve very high optical coupling efficiency between the outputs of the first 210 and second optical source 212 and the inputs of the first 206 and second optical waveguide 208. The method 500 of assembling a multi-source optical module enables a higher level of integration in optoelectronic and optical modules compared with known methods. Consequently, the methods of assembling multi-source optical modules according to the present invention can be used to construct optical and optoelectronic systems and subsystems that have reduced size, lower cost, and higher reliability compared with known systems and subsystems.

Figure 6:
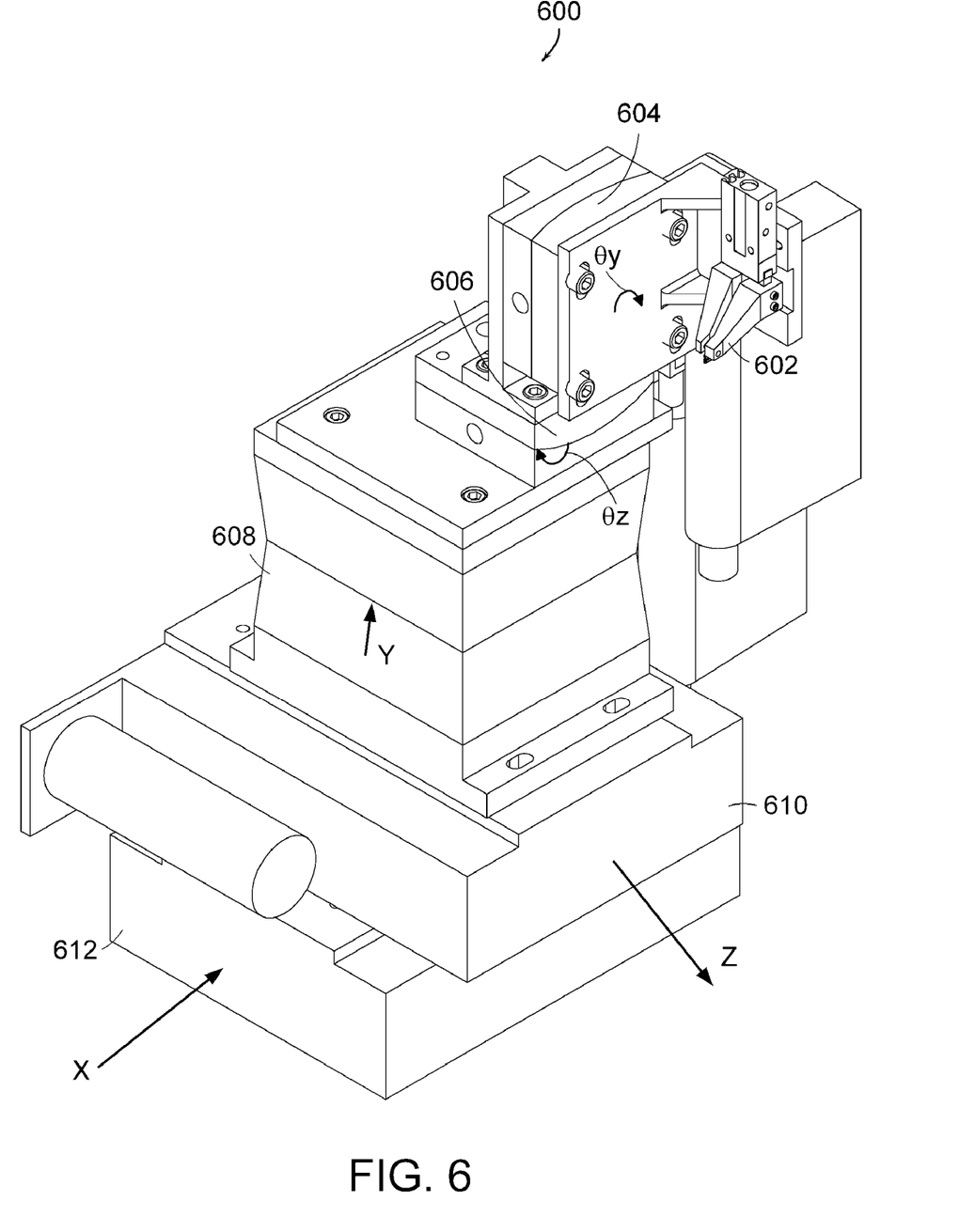
FIG. 6 is a drawing of a multi-axis micromanipulator stage that can be used to assemble a multi-source optical module according to the present invention.

FIG. 6 is a drawing of a multi-axis micromanipulator stage 300 that can be used to assemble a multi-source optical module according to the present invention. The micromanipulator stage 600 includes a pair of jaws 602, or other holding means, that clamp the positioning member 414 (FIG. 4) of the lens holder 406 or the lens holder 406 itself. The pair of jaws 602 are attached to a first rotational stage 604, which is indicated in FIG. 6 as a theta Y angular rotation stage. The first rotational stage 604 can be physically rotated in the theta Y direction by hand or can be physically rotated by using a stepper motor.

A second rotational stage 606, which is indicated in FIG. 6 as a theta Z angular rotation stage, is attached to the first rotational stage 604. The second rotational stage 606 can be physically rotated in the theta Z direction by hand or can be physically rotated by using a stepper motor. A first translation stage 608, which is indicated in FIG. 6 as a Y direction translation stage, is attached to the second rotational stage 606. The first translation stage 608 can be physically translated in the X direction by hand or can be physically translated by using a stepper motor.

A second translation stage 610, which is indicated in FIG. 6 as a Z direction translation stage, is attached to the first translation stage 608. The second translation stage 610 can be physically translated in the Z direction by hand or can be physically translated by using a stepper motor. A third translation stage 612, which is indicated in FIG. 6 as a X direction translation stage, is attached to the second translation stage 610. The third translation stage 612 can also be physically translated in the X direction by hand or can be physically translated by using a stepper motor.

Numerous other types of micromanipulator stages can be used to assemble a multi-source optical module according to the present invention. For example, a micromanipulator stage with a third rotation stage (not shown) can be used to assemble a multi-source optical module according to the present invention. The micromanipulator stage can be manually operated by a technician's hand or can be operated under partial or full control of a computer that drives stepper motors.

Equivalents

While the invention has been particularly shown and described with reference to specific preferred embodiments, it should be understood by those skilled in the art that various changes in form and detail may be made therein without departing from the spirit and scope of the invention as defined herein.

What is claimed is:

1. A multi-source optical module comprising:
   a) an optical circuit that is positioned on a base of the multi-source optical module, the optical circuit having a first and a second optical input;
   b) a first and a second optical source that are positioned on the base of the multi-source optical module relative to the optical circuit; and
   c) a first lens being positioned between an output of the first optical source and the first optical input of the optical circuit, a second lens being positioned between an output of the second optical source and the second input of the optical circuit, at least one of the first and the second lenses being positionable with a positioning member that is shaped to facilitate moving the lens in the X, Y, Z and theta axis with a micromanipulator stage so that the output of a respective one of the first and second optical sources and a respective one of the first and the second optical inputs of the optical circuit are aligned.

2. The optical module of claim 1 wherein the optical circuit comprises an optical integrated circuit.

3. The optical module of claim 1 wherein the optical circuit comprises a discrete-type optical circuit.

4. The optical module of claim 1 wherein the optical circuit is attached to the base with an adhesive material.

5. The optical module of claim 1 wherein the optical circuit is soldered to the base.

6. The optical module of claim 1 wherein at least one of the first and the second optical sources comprises a semiconductor laser.

7. The optical module of claim 1 wherein at least one of the first and the second optical sources is soldered onto the base.

8. The optical module of claim 1 wherein the second optical source is positioned relative to the first optical source on the base so as to increase thermal impedance between the first and the second optical sources.

9. The optical module of claim 1 wherein the first and the second optical sources are positioned so that the first optical source is thermally isolated from the second optical source.

10. The optical module of claim 1 wherein at least one of the first and the second optical sources comprises an array of optical sources.

11. The optical module of claim 1 wherein at least one of the first and the second lenses comprises a silicon lens.

12. The optical module of claim 1 wherein at least one of the first and the second lenses comprises a plastic lens.

13. The optical module of claim 1 wherein at least one of the first and the second lenses are positionable in at least three dimensions.

14. The optical module of claim 1 wherein the optical module comprises at least one of an optical multiplexer and an optical demultiplexer.

15. A method of manufacturing a multi-source optical module, the method comprising:
   a) attaching an optical circuit to a base of the multi-source optical module;
   b) attaching a first and a second optical source to the base of the multi-source optical module;
   c) positioning a first lens between an output of the first optical source and a first optical input of the optical circuit and positioning a second lens between an output of the second optical source and a second optical input of the optical circuit, wherein the first and the second lenses are positioned with a positioning member that is shaped to facilitate moving the lens in the X, Y, Z and theta axis with a micromanipulator stage; and
   d) manipulating at least one of the first and the second lenses to obtain a desired coupling between a respective output of the first and second optical source and a respective one of the first and second optical inputs of the optical circuit.

16. The method of claim 15 wherein the manipulating the at least one of the first and the second lenses comprises manipulating at least one of the first and the second lenses with a micromanipulator stage.

17. The method of claim 15 wherein the manipulating is performed actively.

18. The method of claim 15 further comprising fixing at least one of the first and the second lenses in place after the manipulation.

19. The method of claim 18 wherein the fixing the at least one of the first and the second lenses in place comprises attaching the at least one of the first and the second lenses to the base.

20. The method of claim 15 wherein the attaching the first optical source to the base and the attaching the second optical source to the base further comprise positioning the first optical source relative to the second optical source at a position that increases a thermal impedance path between the first and the second optical source.

21. The method of claim 15 further comprising hermetically packaging the multi-source optical module.

22. The method of claim 15 wherein the manipulating the at least one of the first and the second lenses to obtain a desired coupling comprises manipulating the at least one of the first and the second lenses in at least three dimensions.

23. The method of claim 15 wherein the manipulating the at least one of the first and the second lenses to obtain a desired coupling comprises manipulating the at least one of the first and the second lenses to increase optical transmission through a respective one of the first and the second optical inputs of the optical circuit.

24. A multi-source optical module comprising:
   a) means for attaching an optical circuit to a base of a multi-source optical module;
   b) means for attaching a first and a second optical source to the base of the multi-source optical module;
   c) means for positioning a first lens between an output of the first optical source and a first optical input of the optical circuit and for positioning a second lens between an output of the second optical source and a second optical input of the optical circuit, wherein the means for positioning includes a positioning member that is shaped to facilitate moving the lens in the X, Y, Z and theta axis with a micromanipulator stage;
   d) means for manipulating at least one of the first and the second lenses to obtain a desired coupling between a respective output of the first and second optical source and a respective one of the first and second optical inputs of the optical circuit; and
   e) means for fixing the at least one of the first and the second lenses in place.

* * * * *